UNITED STATES PATENT OFFICE.

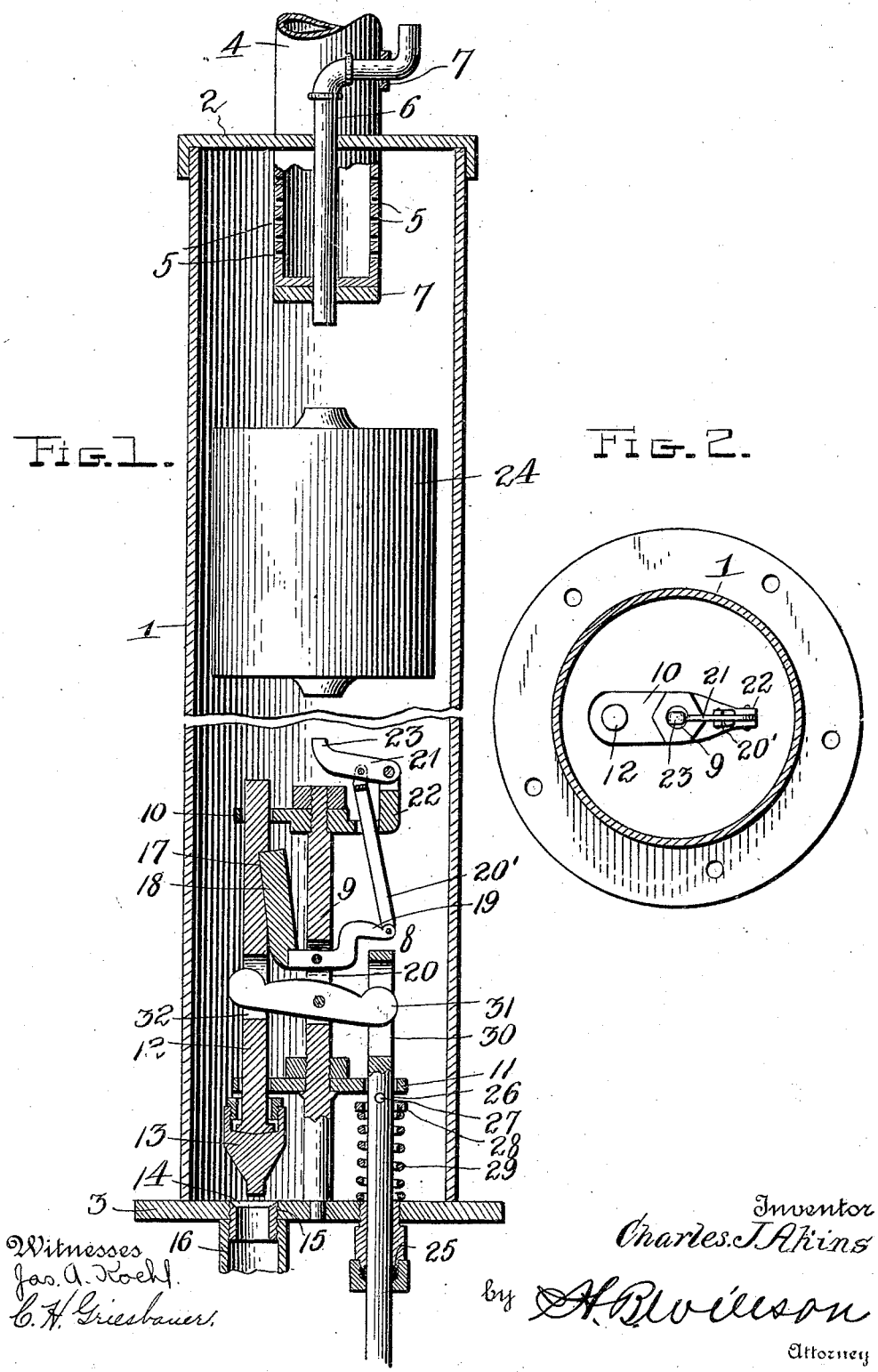

CHARLES J. AKINS, OF HUNTINGTON, OREGON, ASSIGNOR OF ONE-HALF TO GEORGE W. SHERK AND B. W. GRAHAM, OF HUNTINGTON, OREGON.

FLUSH-TANK.

No. 841,213.      Specification of Letters Patent.      Patented Jan. 15, 1907.

Application filed May 5, 1905. Serial No. 258,948.

*To all whom it may concern:*

Be it known that I, CHARLES J. AKINS, a citizen of the United States, residing at Huntington, in the county of Baker and State of Oregon, have invented certain new and useful Improvements in Flush-Tanks; and I do declare the following to be a full, clear, and exact description of the invention, such as will enable others skilled in the art to which it appertains to make and use the same.

This invention relates to improvements in flush-tanks.

The object of the invention is to provide an improved means for operating the discharge-valve of flush-tanks, whereby the same will be automatically closed upon the discharge of water therefrom, means being provided whereby water will flow into the same noiselessly, and means whereby the air may be discharged therefrom as the same is being filled after each discharge.

A further object is to provide a flush-tank valve and means for operating the same which will be simple, strong, and durable in construction, efficient and reliable in operation, and well adapted to the purpose for which it is designed.

With these and other objects in view the invention consists of certain novel features of construction, combination, and arrangement of parts, as will be hereinafter described and claimed.

In the accompanying drawings, Figure 1 is a vertical sectional view through a flush-tank constructed and arranged in accordance with the invention, and Fig. 2 is a horizontal sectional view taken immediately above the valve-operating mechanism.

Referring more particularly to the drawings, 1 denotes the tank, which is preferably cylindrical in form and constructed of sheet metal and which may be of any suitable size. The tank 1 is closed at its upper and lower ends by cap-plates 2 and 3, and through the upper cap-plate 2 is adapted to project the lower end of a supply-pipe 4, leading from a supply-tank or water-main. (Not shown.) The lower end of the supply-pipe 4 is projected into the tank 1 and is provided with small perforations or apertures 5, through which water will noiselessly discharge through the tank. Also projecting through the upper cap-plate 2 is an air-discharge pipe 6, said pipe being supported in brackets 7, secured to the supply-pipe 4, as shown. The lower end of the pipe 6 opens into the tank 1 slightly below the lower end of the supply-pipe 4, and the upper end of the air-pipe opens to the atmosphere at a point immediately above the top of the tank 1, as shown.

In the lower end of the tank is arranged a valve-operating mechanism 8, said mechanism being here shown as consisting of a centrally-disposed upwardly-projecting standard 9, which is secured at its lower end to the lower cap-plate 3 and has secured thereto upper and intermediate laterally-projecting apertured guide-brackets 10 and 11. In the guide-brackets 10 and 11 at one side of the standard 9 is slidably mounted a valve-stem 12, on the lower end of which is loosely mounted a conical valve 13. This valve 13 is adapted to be engaged with a valve-seat 14, formed in the upper end of a discharge-opening 15, with which is adapted to be connected a discharge-pipe 16.

In the side of the valve-stem 12, adjacent to the standard 9, is formed a recess or shoulder 17, with which is adapted to be automatically engaged a weighted upwardly-projecting pawl or dog 18, fixedly mounted upon the laterally-projecting end of a lever 19, extending through and pivotally mounted in a slot 20, formed in the standard 9. To the outer end of the lever 19 is pivotally connected the lower end of the connecting rod or link 20', the upper end of which projects through the upper guide-bracket 10 and is pivotally connected to a trip arm or bar 21, pivotally mounted in the bifurcated upper end of an upwardly-projecting lug 22, formed on the outer end of the upper guide-bracket, as shown.

On the outer end of the trip-bar 21 is formed an upwardly-projecting lug 23, which is adapted to be engaged by the float 24, which is disposed in the tank 1 and is adapted to be raised and lowered by the filling and discharge of the water from the tank. In the lower cap-plate 3 is arranged a packing-gland or stuffing-box 25, through which is adapted to project an operating-rod 26. The upper end of the rod 26 passes through and is slidably engaged with the lower guide-bracket 11. In the rod 26 is arranged a transversely-disposed stop-pin 27, below which is arranged a washer 28. Between said washer and the lower cap-plate 3 is arranged a coil-spring 29, the tension of which is normally exerted to force the operating-rod upwardly until the stop-pin 27 engages the bracket-arm 11.

In the upper end of the operating-rod 26 is formed a vertically-disposed slot 30, through which is adapted to project one end of a trip-arm 31, pivotally mounted in the slot 20 of the standard 9. The opposite end of said trip-arm is adapted to engage a slot 32, formed in the valve-stem 12, whereby when the operating-rod 26 is pulled downwardly the trip-arm 31 will be rocked thereby to cause the same to lift the valve-rod 12 and the valve 13 upwardly, thus opening the discharge-aperture 15 in the lower cap-plate 3 and permitting the water to be discharged from the tank. When the valve-rod is thus lifted by the operating-rod 26, the weighted pawl or dog 18 will automatically drop into engagement with the shoulder 19 formed in said rod, thereby holding the same in an elevated position and keeping the valve open until the water has been discharged from the tank and the float 24 lowered by the discharge of the water and until the lower end of said float comes into engagement with the lug 23 on the trip-arm 21. At this time the weight of the float will rock said trip-bar, causing the same to actuate the lever 19 and release the pawl or dog 18 from engagement with the notch 17 in the valve-rod, thereby permitting the valve to drop into engagement with its seat, and thus closing the discharge-aperture 15. By reason of the loose connection of the valve 13 with the lower end of the valve-stem 15 the same will be caused to drop into perfect engagement with its seat, in which position it will be held by the pressure of the water in the tank to prevent any discharge or leakage of the water therethrough.

The size of the discharge-aperture 15 is such with respect to the inlet-apertures 5 and the supply-pipe 4 that the egress of the water from the tank will be much more rapid than the ingress of the same, thus emptying the tank and automatically closing the valve before a great amount of water has been let into the same. After the discharge-aperture has been closed by the valve 13 and the tank is again filled the float 24 will rise with the water until the upper end of the same is brought into engagement with the inlet-opening of the air-pipe 6, thus closing said air-pipe.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a device of the character described, the combination with a cylindrical tank or receptacle having a discharge-aperture formed in its lower end, a valve adapted to open and close said discharge-aperture, means whereby the valve is manually operated to open the same, an automatically-operating catch mechanism to lock said valve in an open position during the discharge of water from said tank, a cylindrical float free within the tank and adapted to be guided in its movements by the inner wall of said tank, said float having reduced upper and lower ends, a perforated inlet-pipe in the upper portion of the tank, and an air-pipe passing out through the tank, whereby said tank is noiselessly filled, the reduced upper end of said float adapted to close the air-pipe when the float is in its upper position and the reduced lower end of the float adapted to release said catch mechanism when in its lower position to seat the valve, substantially as described.

2. In a device of the character described, the combination with a cylindrical tank having a discharge-aperture formed in its lower end, a valve adapted to open and close said discharge-aperture, an air-pipe extending into the upper end of said tank, and a float free to rise and fall within the tank and adapted to be guided by the inner wall thereof, said float having reduced upper and lower ends, the lower reduced end adapted to operate the valve and the upper reduced end adapted to open and close the end of the air-pipe, substantially as described.

In testimony whereof I have hereunto set my hand in presence of two subscribing witnesses.

CHARLES J. AKINS.

Witnesses:
W. W. WILKERSON,
W. H. LEITNER.